(12) United States Patent
Yamamoto et al.

(10) Patent No.: US 12,257,865 B2
(45) Date of Patent: Mar. 25, 2025

(54) VALVE STEM AND TIRE VALVE

(71) Applicant: PACIFIC INDUSTRIAL CO., LTD., Ogaki (JP)

(72) Inventors: Masahiko Yamamoto, Fuwa-gun (JP); Katsuji Ono, Motosu (JP); Michinari Hirose, Ibi-gun (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 454 days.

(21) Appl. No.: 17/774,244

(22) PCT Filed: Feb. 28, 2020

(86) PCT No.: PCT/JP2020/008401
§ 371 (c)(1),
(2) Date: May 4, 2022

(87) PCT Pub. No.: WO2021/171577
PCT Pub. Date: Sep. 2, 2021

(65) Prior Publication Data
US 2022/0410644 A1    Dec. 29, 2022

(51) Int. Cl.
*B60C 29/00* (2006.01)
*B60C 23/04* (2006.01)
*B60C 29/02* (2006.01)

(52) U.S. Cl.
CPC ........ *B60C 29/005* (2013.01); *B60C 23/0494* (2013.01); *B60C 23/0496* (2013.01); *B60C 29/02* (2013.01)

(58) Field of Classification Search
CPC ............ B60C 23/0494; B60C 23/0496; B60C 29/005; B60C 29/02
See application file for complete search history.

(56) References Cited

U.S. PATENT DOCUMENTS 6,005,480 A    12/1999 Banzhof et al.
9,278,591 B2 *    3/2016 Chen ................. B60C 29/02
(Continued)

FOREIGN PATENT DOCUMENTS

CN    109153299 A    1/2019
EP    3 138 703 A1    3/2017
(Continued)

OTHER PUBLICATIONS

Mar. 13, 2024 Office Action issued in Chinese Patent Application No. 202080072254.8.
(Continued)

*Primary Examiner* — Jill E Culler
(74) *Attorney, Agent, or Firm* — Oliff PLC (57) ABSTRACT

A valve stem to be mounted to a valve mounting hole of a tire wheel includes a stem body that is pipe-shaped, contains a valve core inside, and has a proximal end to which an electrical circuit unit is fixed, and a cover member made of elastomer and covering an outer side of the stem body. The valve stem includes an engagement groove formed on an outer circumferential surface of a proximal end of the cover member to engage with an opening edge of the valve mounting hole, and a weight adjustment member having a higher specific gravity than the cover member and made of a material different from that of the stem body. The weight adjustment member is embedded in the cover member and positioned closer to a distal end of the cover member than the engagement groove.

20 Claims, 9 Drawing Sheets

(56) References Cited

U.S. PATENT DOCUMENTS

| | | | |
|---|---|---|---|
| 10,384,498 B2* | 8/2019 | Foor | B60C 23/00363 |
| 10,787,048 B2* | 9/2020 | Ebinuma | B60C 23/0498 |
| 2002/0033051 A1 | 3/2002 | Shimura et al. | |
| 2002/0163245 A1 | 11/2002 | Watanabe et al. | |
| 2005/0087007 A1 | 4/2005 | Uleski | |
| 2008/0164750 A1 | 7/2008 | Vanetta | |
| 2014/0261753 A1 | 9/2014 | Burlett et al. | |
| 2019/0047337 A1 | 2/2019 | Seifert | |
| 2022/0355629 A1* | 11/2022 | Sunayama | B60C 23/0498 |

FOREIGN PATENT DOCUMENTS

| | | |
|---|---|---|
| GB | 1 414 554 A | 11/1975 |
| JP | 2002-166708 A | 6/2002 |
| JP | 2005-186658 A | 7/2005 |
| JP | 2005-299801 A | 10/2005 |
| JP | 2007-510135 A | 4/2007 |
| JP | 2012-047686 A | 3/2012 |
| JP | 2016-175605 A | 10/2016 |
| JP | 2018-096471 A | 6/2018 |

OTHER PUBLICATIONS

Apr. 14, 2020 International Search Report issued in International Patent Application No. PCT/JP2020/008401.
Aug. 17, 2023 Office Action issued in Chinese Patent Application No. 202080072254.8.
Oct. 28, 2022 Office Action issued in European Patent Application No. 20921106.9.
Oct. 18, 2022 Search Report issued in European Patent Application No. 20921106.9.

\* cited by examiner

VALVE STEM AND TIRE VALVE

TECHNICAL FIELD

The present disclosure relates to a valve stem mounted to a valve mounting hole of a tire wheel and containing a valve core inside, and to a tire valve with the valve core contained inside the valve stem.

BACKGROUND ART

A valve stem including a pipe-shaped stem body with an electrical circuit unit fixedly attached to a proximal end of the stem body, and an elastomeric cover member covering the outer side of the stem body has conventionally been known, wherein a proximal end of the cover member engages with an opening edge of a valve mounting hole of a tire wheel (see, for example, Patent Document 1).

RELATED ART DOCUMENTS

Patent Documents

Patent Document 1: JP-A-2016-175605 (paragraphs [0019], [0031], and [0032], FIG. 3, etc.)

SUMMARY OF THE INVENTION

Problems to be Solved by the Invention

An ability to allow the tire valve to be securely fixed to the tire wheel is required for the above mentioned valve stem.

Means of Solving ohe Problems

An invention according to one aspect made to solve the above problem is a valve stem to be mounted to a valve mounting hole of a tire wheel, the valve stem including: a stem body that is pipe-shaped, contains a valve core inside, and has a proximal end to which an electrical circuit unit is fixed; a cover member made of elastomer and covering an outer side of the stem body; an engagement groove formed on an outer circumferential surface of a proximal end of the cover member to engage with an opening edge of the valve mounting hole; and a weight adjustment member having a higher specific gravity than the cover member and made of a material different from that of the stem body, the weight adjustment member being embedded in the cover member and positioned closer to a distal end of the cover member than the engagement groove.

MODE FOR CARRYING OUT THE INVENTION

First Embodiment

Figure 1:
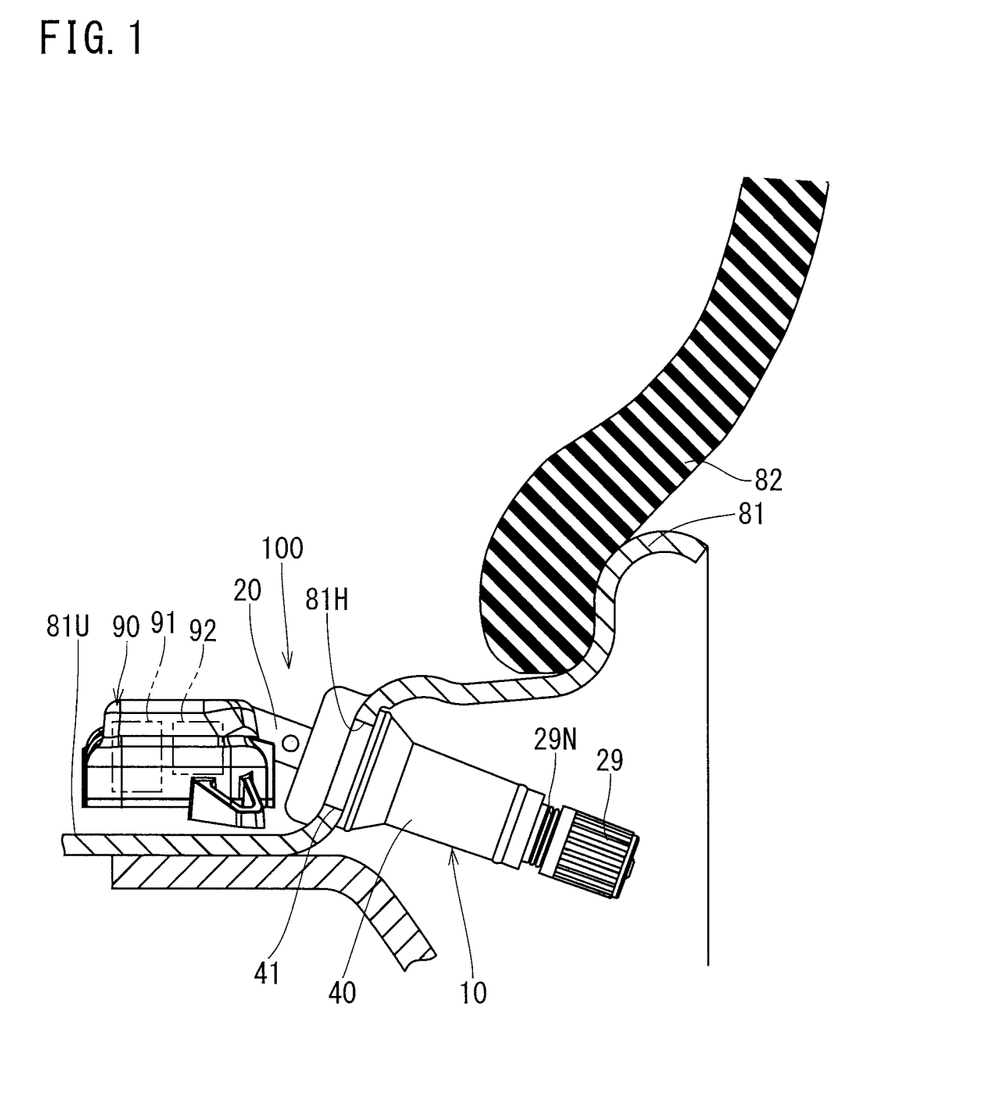
FIG. 1 is a cross-sectional view of a tire wheel to which a tire valve according to a first embodiment of the present disclosure is attached.

FIG. 1 shows a tire valve 100 having a valve stem 10 of the first embodiment. The tire valve 100 of this embodiment is so designed that the valve stem 10 is mounted to a valve mounting hole 81H provided in a tire wheel 81 (more particularly, rim). The tire valve 100 includes an electrical circuit unit 90 fixed to a proximal end of the valve stem 10. The valve stem 10 at a portion close to the proximal end is fitted to the valve mounting hole 81H. When the tire valve 100 is mounted to the tire wheel 81, the electrical circuit unit 90 is disposed inside the tire 82. The valve stem 10 has an air injection port 20K (see FIG. 2) at a distal end, and this distal end is disposed outside the tire 82.

The valve mounting hole 81H extends through a side face of a drop center 81U of the rim of the tire wheel 81 and the tire valve 100 is arranged to extend laterally. More particularly, the side face of the center drop 81U is inclined with respect to the center axis of the tire wheel 81 so that the tire valve 100 is arranged to be tilted, with the distal end of the valve stem 10 oriented downward.

Inside the electrical circuit unit 90 are provided a sensor 91 that detects the status of the tire 82, and a wireless circuit 92 that wirelessly transmits the detection results from the sensor 91. In this embodiment, for example, the sensor 91 is a pressure sensor that detects internal pressure of the tire 82.

Figure 2:
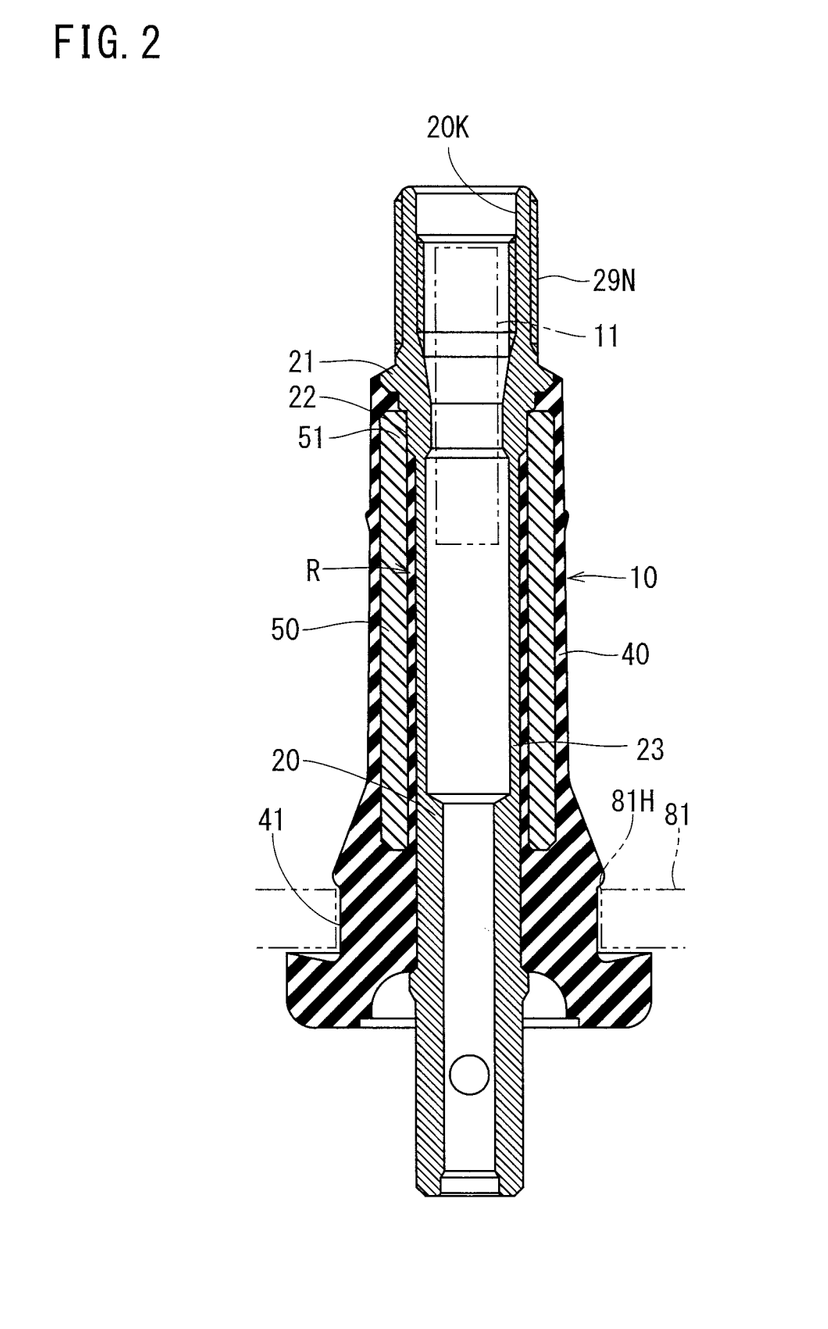
FIG. 2 is a cross-sectional side view of a valve stem.

As shown in FIG. 2, the valve stem 10 has a pipe-shaped stem body 20 and a cover member 40 covering an outer side of the stem body. Specifically, the cover member 40 covers a middle part of the stem body 20 so that the distal end and proximal end of the stem body 20 stick out from the cover member 40. The air injection port 20K mentioned in the foregoing for air injection into the tire 82 is provided at the distal end of the stem body 20. An external thread 29N is formed on an outer circumferential surface at the distal end of the stem body 20. A cap 29 (see FIG. 1) is mated from outside with the external thread 29N. The electrical circuit unit 90 mentioned in the foregoing is fixed to the proximal end of the stem body 20. In this embodiment, the stem body 20 is made of brass. The stem body 20 may instead be made of other metal than brass, or resin, for example.

The stem body 20 contains a valve core 11 inside. Between an outer circumferential surface of the valve core 11 and an inner circumferential surface of the stem body 20 is provided a seal, so that an air passage formed inside the stem body 20 and communicating the inside and outside of the tire 82 is opened and closed by opening and closing the valve core 11.

An annular protrusion 21 extends out from an outer circumferential surface near the distal end of the stem body 20. The annular protrusion 21 is located at the boundary between the part of the stem body 20 covered by the cover member 40 and the external thread 29N. The proximal end side portion of the stem body 20 is formed as a small diameter part 23 having a smaller outer diameter than the annular protrusion 21, and between this small diameter part 23 and the annular protrusion 21 is formed an intermediate diameter part 22, having an outside diameter that is intermediate between the diameters of the small diameter part 23 and the annular protrusion 21.

The cover member 40 is made of elastomer. An annular engagement groove 41 is formed on an outer circumferential surface of a proximal end of the cover member 40. The engagement groove 41 is located such as to surround a portion of the small diameter part 23 close to the proximal end of the stem body 20. The engagement groove 41 engages with an opening edge of the valve mounting hole 81H when the tire valve 100 is mounted to the valve mounting hole 81H of the tire wheel 81.

The valve stem 10 further includes a weight adjustment member 50 embedded in the cover member 40 closer to the distal end than the engagement groove 41. The weight adjustment member 50 has a higher specific gravity than the cover member and is made of a material different from that of the stem body 20. In this embodiment, the weight adjustment member 50 is made of iron.

As long as the weight adjustment member 50 has a higher specific gravity than the cover member 40 and is made of a material different from that of the stem body 20, the weight adjustment member 50 may be made of other metal than iron, or resin, for example.

Figure 3A:
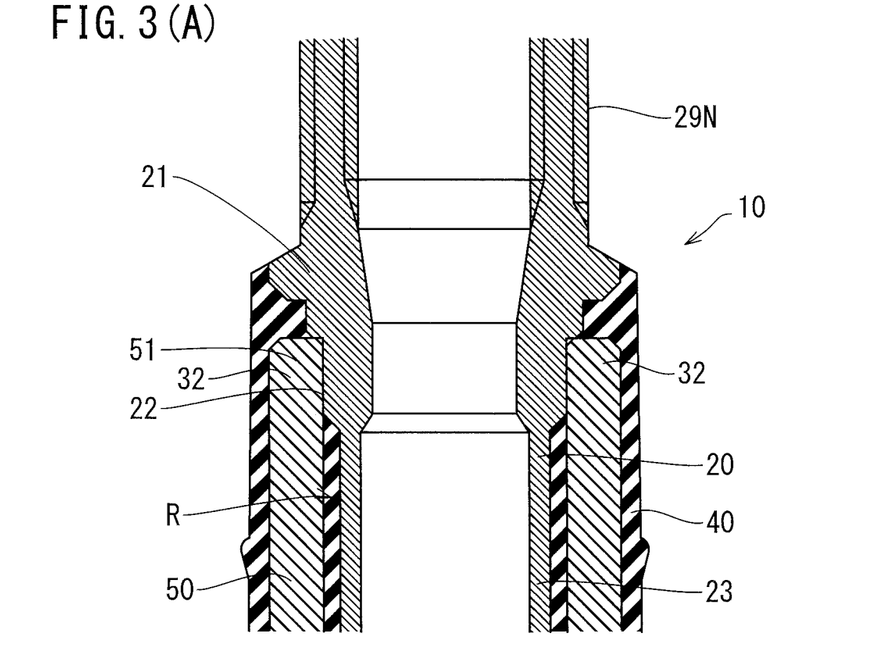
FIG. 3(A) is an enlarged cross-sectional side view around a fitting fixing part of the valve stem.

In this embodiment, the weight adjustment member 50 is tubular and is fitted to the outer side of the stem body 20. Specifically, a fitting fixing part 51 that is fitted and fixed to the intermediate diameter part 22 of the stem body 20 is provided to an axial distal end of the weight adjustment member 50. A tubular region R is formed between the entire weight adjustment member 50 except for the fitting fixing part 51 and the outer circumferential surface of the stem body 20. The tubular region R is so formed that the elastomer forming the cover member 40 can enter into the region. In this embodiment, the tubular region R is filled with the elastomer (see FIG. 2 and FIG. 3(A)).

Figure 3B:
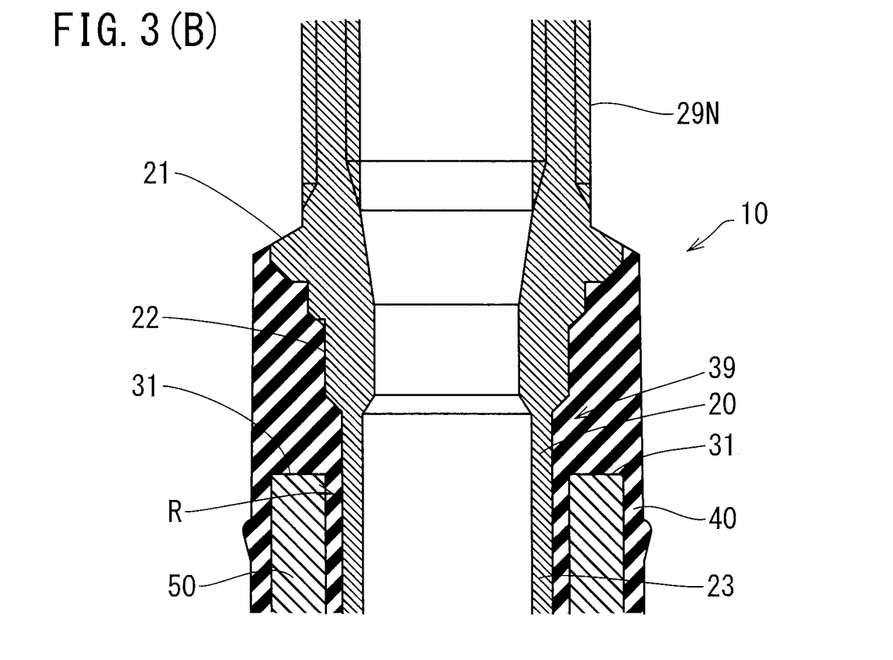
FIG. 3(B) is an enlarged cross-sectional side view around a communication passage of the valve stem.
Figure 4:
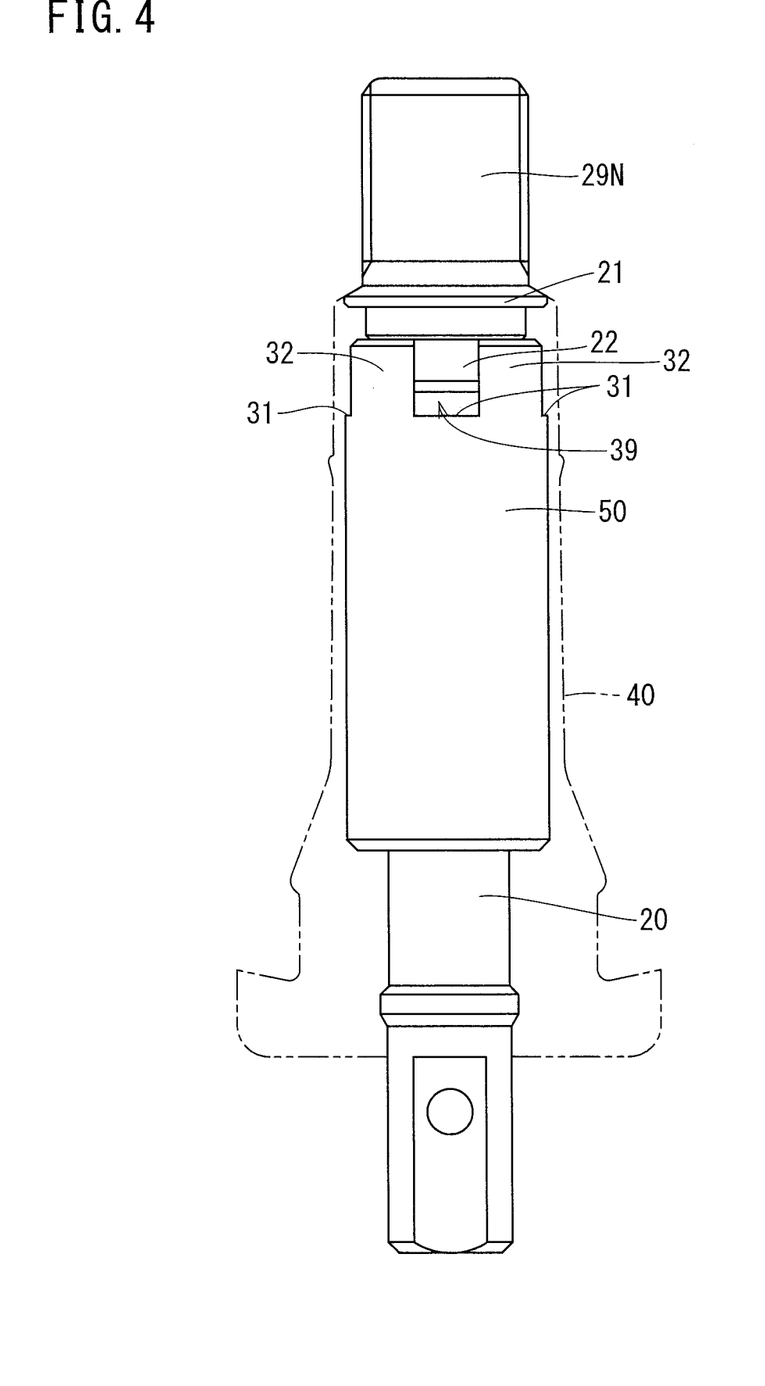
FIG. 4 is a side view of a stem body and a weight adjustment member.
Figure 5A:
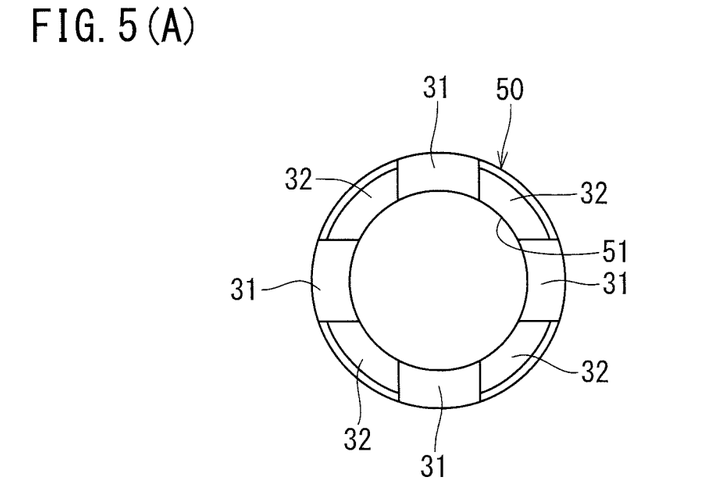
FIG. 5(A) is a plan view of the weight adjustment member and FIG. 5(B) is a side view of the weight adjustment member.
Figure 5B:
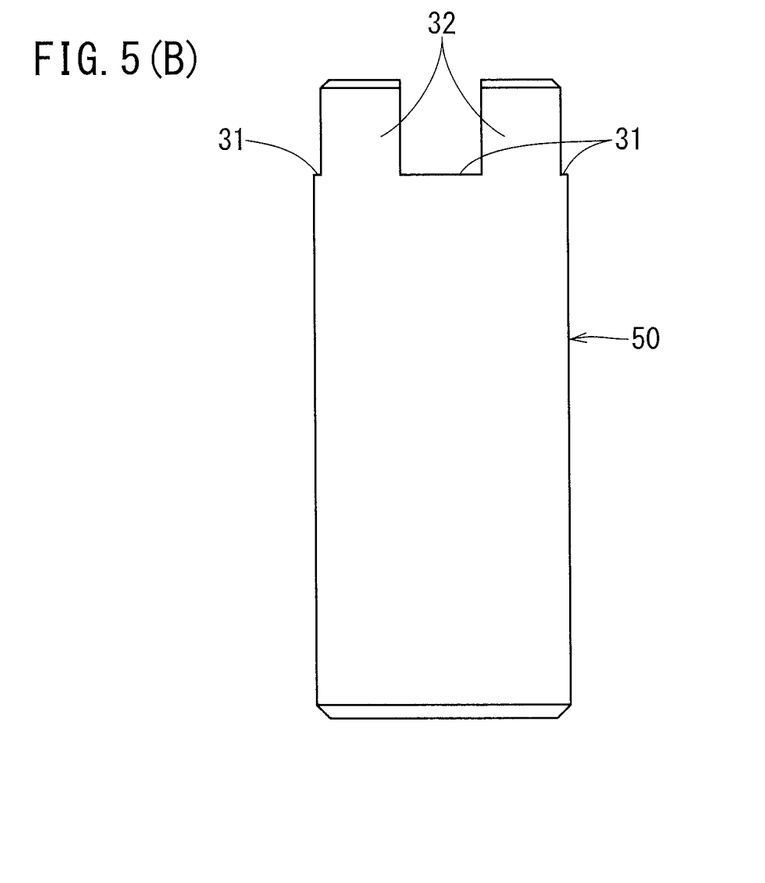

As shown in FIG. 4 and FIG. 5, in this embodiment, notches 31 are formed at the distal end of the weight adjustment member 50. The notch 31 extends from the distal end to a point close to the distal end of the weight adjustment member 50. A plurality of such notches that are circumferentially equally spaced, for example, are provided to the weight adjustment member 50 (see FIG. 5(A)). A plurality of projecting pieces 32 left standing between the notches 31 at the distal end of the weight adjustment member 50 (more particularly, distal ends or middle portions of the projecting pieces 32) constitute the fitting fixing part 51. Moreover, a portion of the notch 31 between proximal ends of the projecting pieces 32 adjacent to each other forms a communication passage 39 that communicates a distal end of the tubular region R with an outer side of the weight adjustment member 50. In this embodiment, as will be described later, this communication passage 39 allows the elastomer to readily enter into the tubular region R (see FIG. 3(B)) during the molding of the cover member 40, so that the tubular region R is readily filled with the elastomer (see FIG. 3(A)). The rectangular shape of the notches 31 and projecting pieces 32 in this embodiment should not be limited thereto. The notches and projecting pieces may be semi-circular, triangular, hexagonal, and so on.

Figure 6:
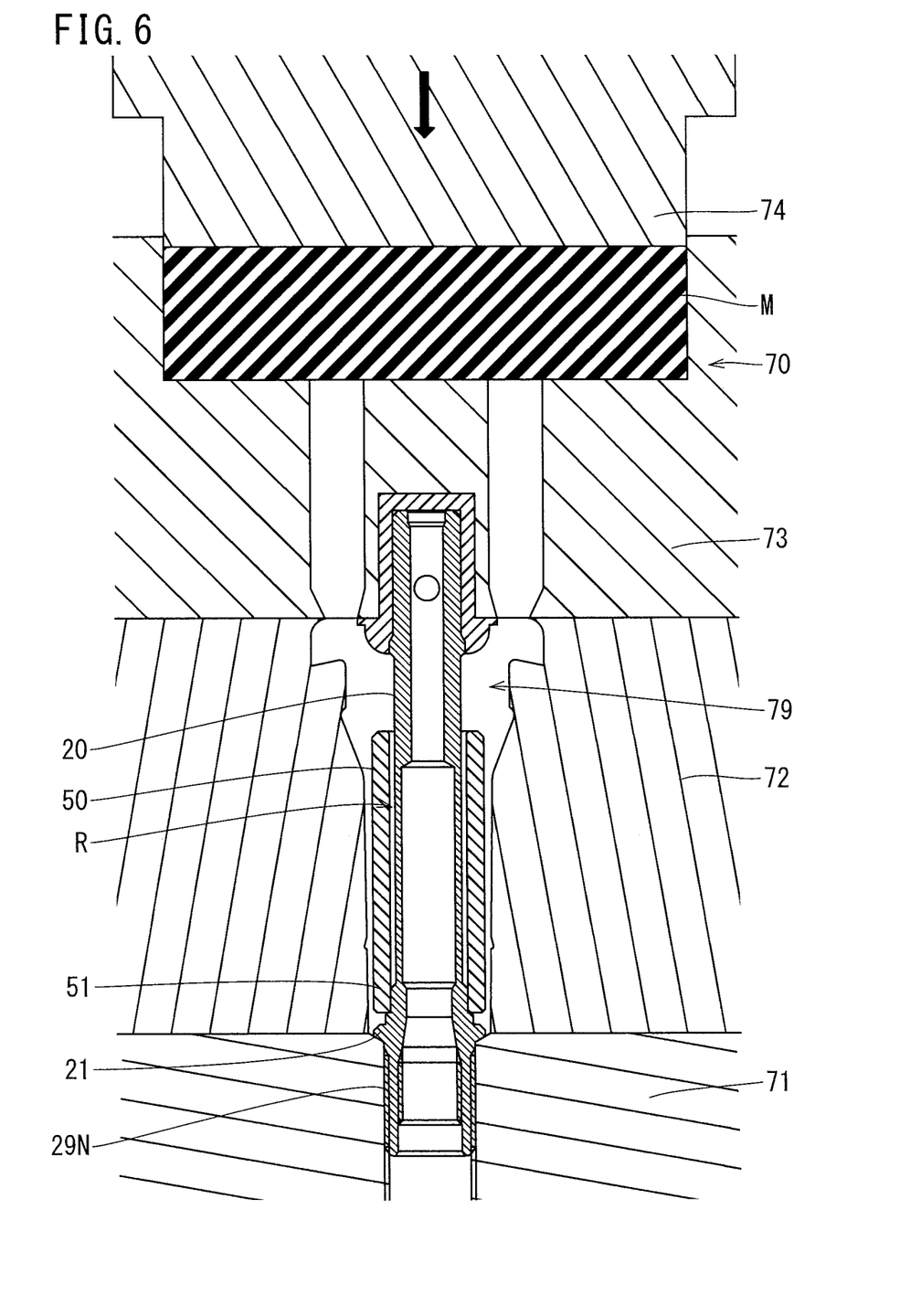
FIG. 6 is a cross-sectional side view of a mold for forming a cover member.
Figure 7:
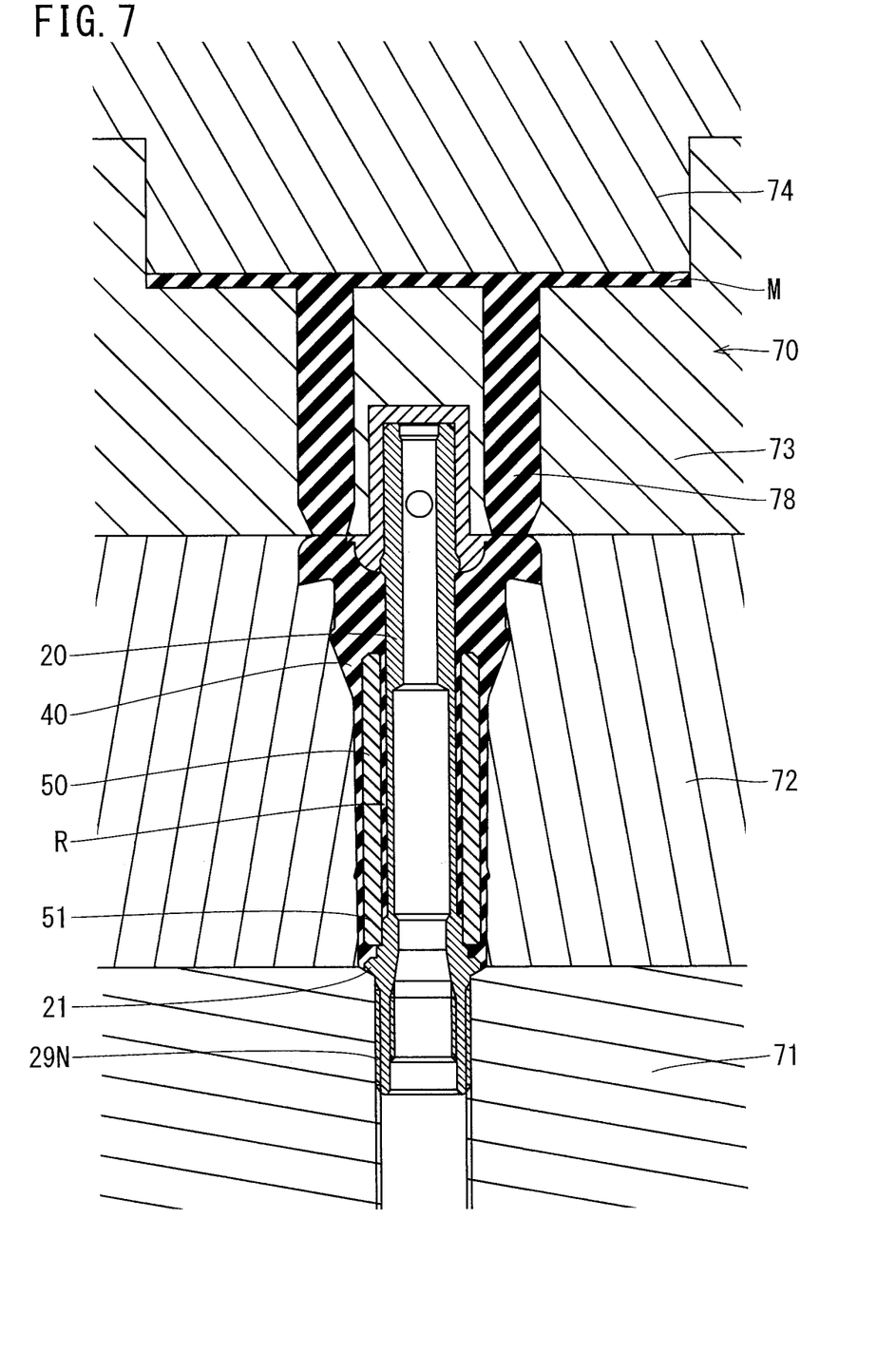
FIG. 7 is a cross-sectional side view of a cover member formed inside the mold.
Figure 8A:
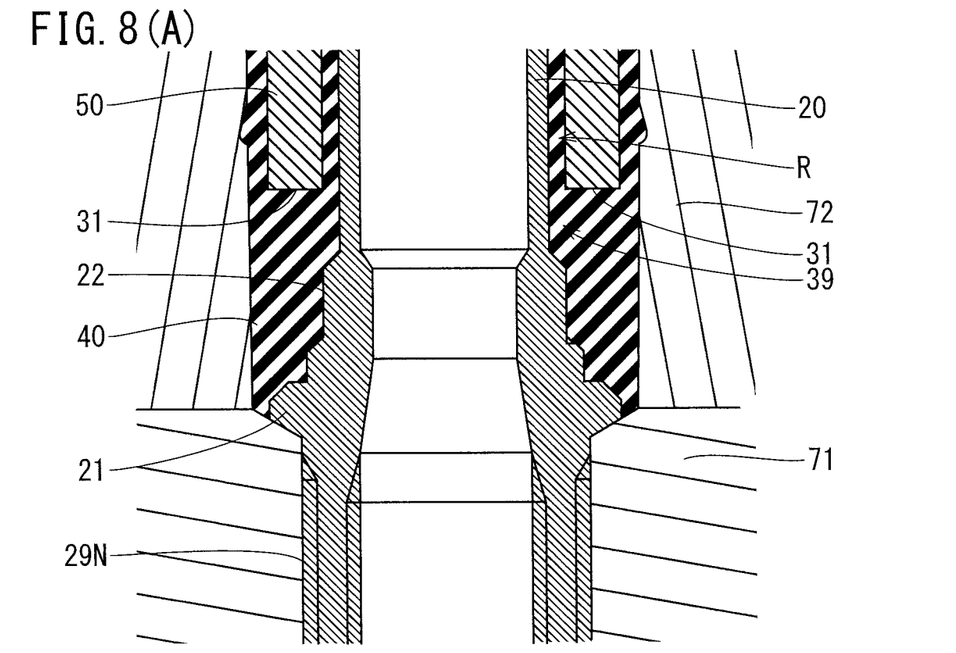
FIG. 8(A) is an enlarged cross-sectional side view around a communication passage of the valve stem.
Figure 8B:
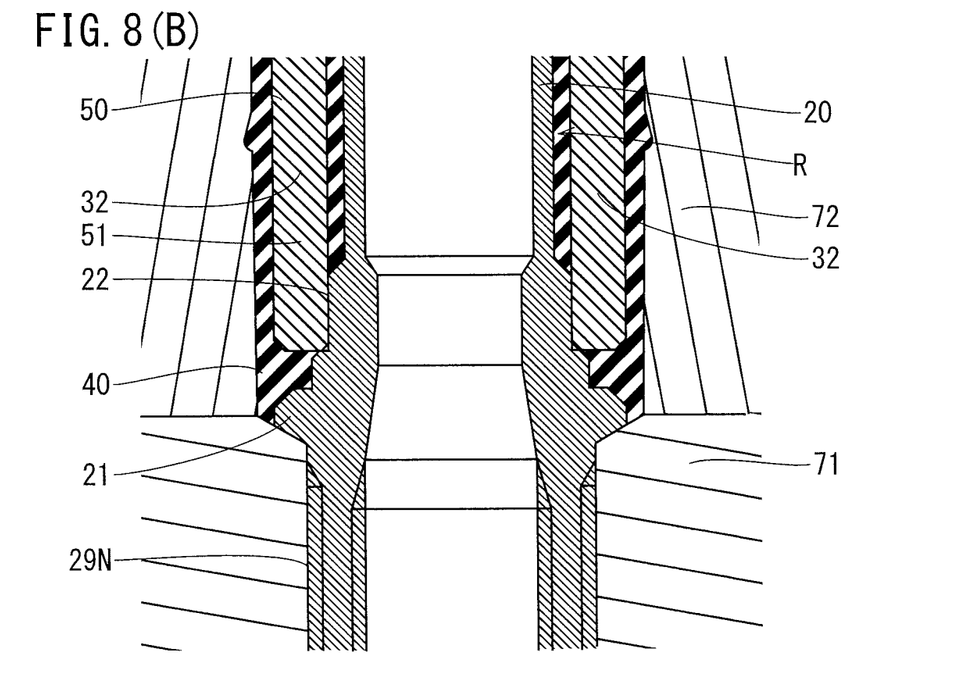
FIG. 8(B) is an enlarged cross-sectional side view around a fitting fixing part of the valve stem.

In this embodiment, the valve stem 10 is produced in the following manner, for example. First, the weight adjustment member 50 is fitted to the outer side of the stem body 20, both of which are then inserted into a cavity 79 of a mold 70 for forming the cover member 40 (see FIG. 6). In this embodiment, as shown in FIG. 6, the cover member 40 is formed by transfer molding from elastomer, for example. More particularly, the mold 70 is made up of a plurality of split molds 71 to 74. The stem body 20 is set with the distal end oriented downward so that the external thread 29N is mated with an internal thread hole in the upper surface of a lowermost located lower mold 71. An elastomer material M that is the raw material of the cover member 40 and softened by heat is pressed into the cavity 79 from above. The cavity 79 is thus filled with the elastomer material M as shown in FIG. 7. The elastomer material M is then cured (vulcanized) to fixedly attach to the stem body 20, and thus the cover member 40 with the weight adjustment member 50 embedded therein is formed.

Figure 9:
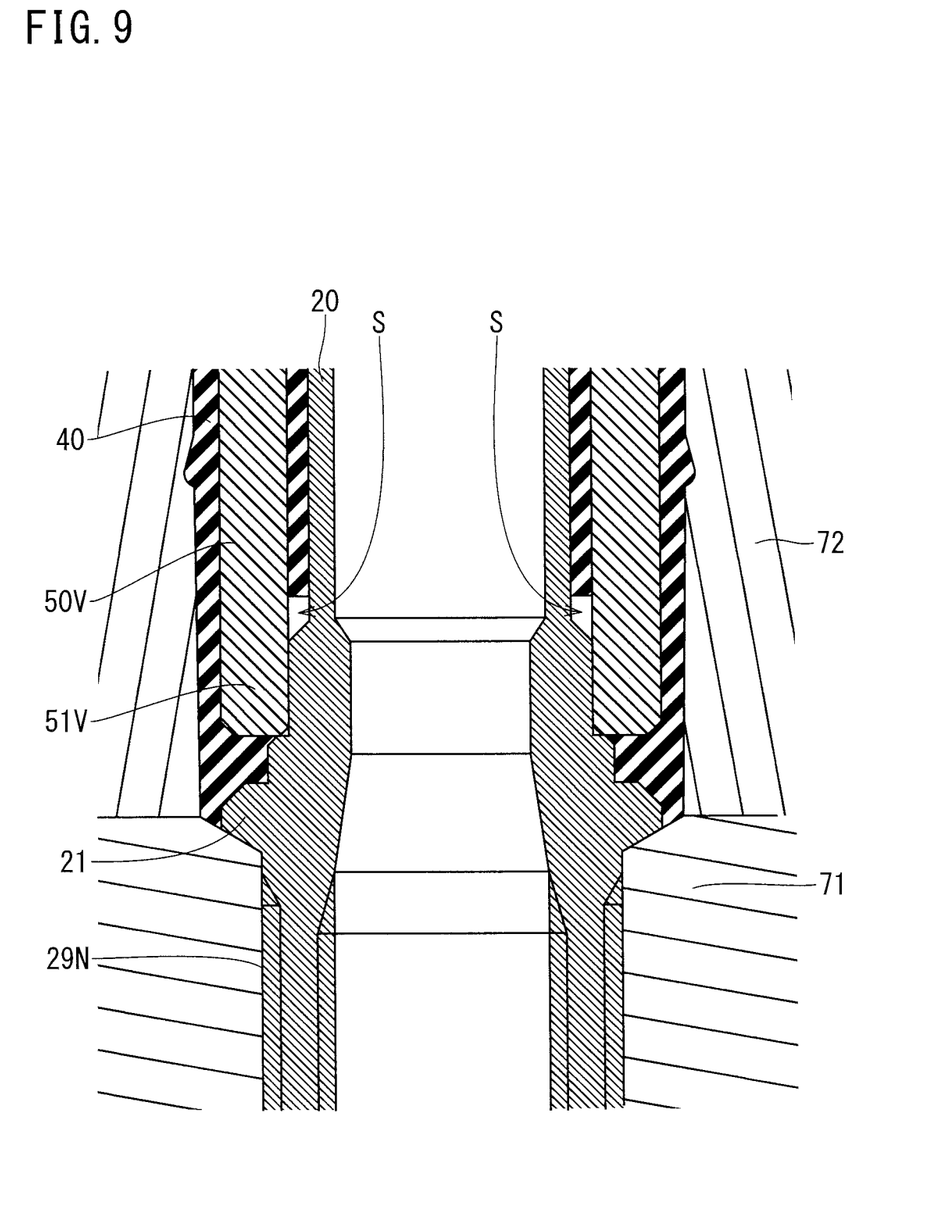
FIG. 9 is an enlarged cross-sectional side view illustrating a production process of a valve stem having a weight adjustment member without notches.

FIG. 9 shows one example of the cover member 40 formed with a weight adjustment member 50 without notches 31. When there are no notches 31, no communication passages 39 are formed, so that gaps S are readily formed in the distal end of the tubular region R as shown in the drawing, due to the difficulty for gas to escape from the distal end of the tubular region R. In contrast, since the notches 31 that form the communication passages 39 are provided to the weight adjustment member 50 in this embodiment, the elastomer material M can easily enter into the tubular region R through the communication passages 39, and the gas can easily escape from the distal end of the tubular region R. Therefore, the entire tubular region R can be readily filled with the elastomer.

After forming the cover member 40 inside the mold 70 as shown in FIG. 7, the stem body 20, weight adjustment member 50, and cover member 40 are removed from the mold 70, and a waste portion 78 of elastomer is removed from the cover member 40, to obtain the valve stem 10 shown in FIG. 2.

In the case where the tire valve 100 is attached to the tire wheel 81 as described above in the manner illustrated in FIG. 1, the weight balance of the tire valve 100 may be adjusted by setting the tire valve 100 such that its center of gravity is in the distal end side portion located outside the tire 82, for example, which minimizes changes in attitude of the tire valve 100 caused by a centrifugal force during rotation of the tire 82. According to the tire valve 100 and valve stem 10 of this embodiment, the engagement groove 41 that engages with the opening edge of the valve mounting hole 81H of the tire wheel 81 is formed on an outer circumferential surface of a proximal end of the cover member 40. The weight adjustment member 50 is embedded in the cover member 40 closer to the distal end than the engagement groove 41. This enables easy adjustment of the weight balance of the tire valve 100 attached to the tire wheel 81 and allows for secure fixing of the tire valve 100.

In this embodiment, the weight adjustment member 50 is made of a material having a higher specific gravity than the cover member 40. This enables easy weight balance adjustment of the valve stem 10 as compared to a case where the weight balance of the tire valve 100 is adjusted by increasing the size of the cover member 40, because there is no need to provide a new mold 70 for forming the cover member 40. Moreover, since the weight adjustment member 50 is made of a material different from that of the stem body 20, a cost reduction is possible, by using a more inexpensive material than that of the stem body 20. The weight adjustment member 50 is embedded in the cover member so that the weight adjustment member 50 is securely fixed. Further, in the case where the weight adjustment member 50 is made of iron, the weight adjustment member 50 being embedded in the cover member 40 and not exposed can prevent corrosion.

In this embodiment, since the weight adjustment member 50 that surrounds the stem body 20 is tubular, the weight adjustment member 50 can reinforce the valve stem 10. Moreover, since the weight adjustment member 50 is fitted to the outer side of the stem body 20, the weight adjustment member 50 is securely fixed. This can prevent a possible loss of weight balance of the tire valve 100 due to a centrifugal force applied to the valve stem 10 during the drive of the vehicle.

In this embodiment, the weight adjustment member 50 is provided with the fitting fixing part 51 that is fitted and fixed to the stem body only at one end of the weight adjustment member, and the tubular region R is formed between the entire weight adjustment member 50 except for the fitting fixing part 51 and an outer surface of the stem body 20, into which the elastomer forming the cover member 40 is able to enter. Since the weight adjustment member 50 is fitted to the stem body 20 only at one end, the weight adjustment member 50 can be fitted to the stem body 20 easily. This can minimize application of an excessive force during fitting and prevent deformation of the stem body 20.

In this embodiment, the weight adjustment member 50 is provided with the communication passage 39 that communicates between an end (distal end) of the tubular region R close to the fitting fixing part 51 and the outside of the weight adjustment member 50. This can minimize stagnation of gas in the distal end of the tubular region R during the forming of the cover member 40 from elastomer.

Other Embodiments (1) In the above embodiment, the communication passage 39 is formed by the notches 31 of the weight adjustment member 50. Instead, a through hole extending radially through the weight adjustment member 50 may be formed in a distal end, and the communication passage 39 may be formed by this through hole. Alternatively, a groove extending in an axial direction of the stem body 20 may be formed in the intermediate diameter part 22 of the stem body 20, and the communication passage 39 may be formed by this groove.

(2) While the weight adjustment member 50 in the above embodiment has a fitting point with the stem body 20 at one end, a fitting point may also be provided to other parts along the axial direction. The fitting point may be provided not at the distal end of the weight adjustment member 50 but at other part (such as, for example, proximal end). In a case where the fitting point is provided at a proximal end of the weight adjustment member 50, notches 31 and communication passages 39 may be provided at the proximal end.

(3) While the weight adjustment member 50 is fitted to the outer side of the stem body 20 in the above embodiment, the weight adjustment member may not necessarily be fitted to the stem body. In this case, for example, the tubular region R may extend entirely along the axial direction between the weight adjustment member 50 and the stem body 20.

(4) While the weight adjustment member 50 in the above embodiment is tubular, the weight adjustment member may not necessarily be tubular. For example, the weight adjustment member may be cuboidal, spherical, rod-shaped (e.g., extending along the axial direction of the stem body 20), ring-shaped (e.g., in the shape of letter O, or C), reticular, and so on.

DESCRIPTION OF THE REFERENCE NUMERAL

10 Tire valve stem
20 Stem body 20
39 Communication passage
40 Cover member
50 Weight adjustment member
R Tubular region

The invention claimed is:

1. A valve stem to be mounted to a valve mounting hole of a tire wheel, the valve stem comprising:
   a stem body that is pipe-shaped, contains a valve core inside, and has a proximal end to which an electrical circuit unit is fixed;
   a cover member made of elastomer and covering an outer side of the stem body;
   an engagement groove formed on an outer circumferential surface of a proximal end of the cover member to engage with an opening edge of the valve mounting hole;
   a tubular weight adjustment member having a higher specific gravity than the cover member and made of a material different from that of the stem body, the weight adjustment member being embedded in the cover member and positioned closer to a distal end of the cover member than the engagement groove to surround the stem body; and
   a tubular region formed between the weight adjustment member and an outer circumferential surface of the stem body, and filled with the elastomer forming the cover member.

2. The valve stem according to claim 1, wherein the weight adjustment member is made of metal.

3. The valve stem according to claim 2, wherein the weight adjustment member is fitted to the outer side of the stem body.

4. The valve stem according to claim 3, wherein the electrical circuit unit includes a pressure sensor detecting pressure inside a tire, and a wireless circuit wirelessly transmitting a detection result from the pressure sensor.

5. A tire valve comprising the valve core contained in the stem body of the valve stem according to claim 3.

6. The valve stem according to claim 2, wherein the electrical circuit unit includes a pressure sensor detecting pressure inside a tire, and a wireless circuit wirelessly transmitting a detection result from the pressure sensor.

7. A tire valve comprising the valve core contained in the stem body of the valve stem according to claim 2.

8. The valve stem according to claim 1, wherein the electrical circuit unit includes a pressure sensor detecting pressure inside a tire, and a wireless circuit wirelessly transmitting a detection result from the pressure sensor.

9. A tire valve comprising the valve core contained in the stem body of the valve stem according to claim 8.

10. A tire valve comprising the valve core contained in the stem body of the valve stem according to claim 1.

11. The tire valve according to claim 10, comprising the electrical circuit unit fixed to the proximal end of the stem body.

12. A valve stem to be mounted to a valve mounting hole of a tire wheel, the valve stem comprising:
   a stem body that is pipe-shaped, contains a valve core inside, and has a proximal end to which an electrical circuit unit is fixed;
   a cover member made of elastomer and covering an outer side of the stem body;

an engagement groove formed on an outer circumferential surface of a proximal end of the cover member to engage with an opening edge of the valve mounting hole; and a weight adjustment member having a higher specific gravity than the cover member and made of a material different from that of the stem body, the weight adjustment member being embedded in the cover member and positioned closer to a distal end of the cover member than the engagement groove, wherein the weight adjustment member is made of metal, wherein the weight adjustment member is tubular and fitted to the outer side of the stem body, and wherein the weight adjustment member is provided with a fitting fixing part that is fitted and fixed to the stem body only at one end of the weight adjustment member, a tubular region is formed between the entire weight adjustment member except for the fitting fixing part and an outer surface of the stem body, and the elastomer forming the cover member is able to enter into the tubular region.

13. The valve stem according to claim 12, wherein either the weight adjustment member or the stem body is provided with a communication passage that communicates between an end of the tubular region close to the fitting fixing part and an outside of the weight adjustment member.

14. The valve stem according to claim 13, wherein the weight adjustment member is provided with a plurality of notches extending from one end to a point close to the one end, distal ends or middle portions of a plurality of projecting pieces left standing between the notches of the weight adjustment member form the fitting fixing part, and the communication passage is formed by a portion of the plurality of notches between proximal ends of the projecting pieces adjacent to each other.

15. The valve stem according to claim 14, wherein the electrical circuit unit includes a pressure sensor detecting pressure inside a tire, and a wireless circuit wirelessly transmitting a detection result from the pressure sensor.

16. A tire valve comprising the valve core contained in the stem body of the valve stem according to claim 14.

17. The valve stem according to claim 13, wherein the electrical circuit unit includes a pressure sensor detecting pressure inside a tire, and a wireless circuit wirelessly transmitting a detection result from the pressure sensor.

18. A tire valve comprising the valve core contained in the stem body of the valve stem according to claim 13.

19. The valve stem according to claim 12, wherein the electrical circuit unit includes a pressure sensor detecting pressure inside a tire, and a wireless circuit wirelessly transmitting a detection result from the pressure sensor.

20. A tire valve comprising the valve core contained in the stem body of the valve stem according to claim 12.

* * * * *